United States Patent [19]

Satoh

[11] 4,349,849
[45] Sep. 14, 1982

[54] TAPE TRACKING DEVICE

[75] Inventor: Ken Satoh, Akikawa, Japan

[73] Assignee: Olympus Optical Co., Ltd., Tokyo, Japan

[21] Appl. No.: 160,598

[22] Filed: Jun. 18, 1980

[30] Foreign Application Priority Data

Jun. 26, 1979 [JP] Japan ................... 54/80331

[51] Int. Cl.³ .................. G06K 13/00; B65H 23/02; G11B 15/18
[52] U.S. Cl. .......................... 360/71; 226/3; 235/475
[58] Field of Search .............. 235/484, 485, 486, 475, 235/476; 360/72, 71, 90; 242/186, 189, 190; 226/3, 184

[56] References Cited

U.S. PATENT DOCUMENTS

| 3,096,919 | 7/1963 | Snyder | 226/3 |
| 3,570,735 | 3/1971 | Kurz | 226/3 |
| 3,701,464 | 10/1972 | Crum | 226/3 |
| 3,943,566 | 3/1976 | Brock | 360/71 |
| 4,135,664 | 1/1979 | Resh | 235/475 |

FOREIGN PATENT DOCUMENTS 2137706  2/1973  Fed. Rep. of Germany.

Primary Examiner—Robert M. Kilgore
Attorney, Agent, or Firm—Frishauf, Holtz, Goodman and Woodward

[57] ABSTRACT

A tape tracking device for a tape recorder comprises first and second position detection heads disposed such that one of the first and second position detection heads is upwardly displaced by its one upper half from a track on which a signal is recorded and reproduced by a record/reproduce head and the other is downwardly displaced by its one lower half from the track, a DC reversible motor rotated according to a difference between the reproduced signals of said first and second position detection heads, and a post tiltable by an eccentric cam attached to a shaft of the motor and adapted to impart a pressure in the up and down directions to correct a deviation of the tape in the direction of the width of the tape.

9 Claims, 5 Drawing Figures

TAPE TRACKING DEVICE

BACKGROUND OF THE INVENTION

This invention relates to a tape tracking device for a tape recorder etc. which maintains a magnetic tape, during a reproduce mode at a reference position in a direction of the width of the magnetic tape.

In a tape recorder for effecting recording and reproduction normally using a magnetic tape, when a tape is shifted in the up and down directions during the reproduce mode, there occurs what is called "off-tracking". Since the level of a reproduced signal is lowered due to the occurrence of "off-tracking" a light-and-dark flicker noise is produced on the reproduction screen in a video tape recorder, deteriorating an image quality. Recently, the enhancement of a recording density is required for a saving of the consumption of magnetic tapes and an attempt is being made to obtain a multi-track device. With a multi-track type tape recorder, in order to enhance the recording density attempts have been made to make a head-to-head spacing smaller and the track width narrower. As the track width becomes narrower and narrower, off-tracking is liable to occur due to the up and down shifting of the magnetic tape, there thus being a marked tendency for the level of a reproduced signal to be lowered. For this reason, a tracking device is provided which maintains the running magnetic tape at a reference position in the direction of the width of the magnetic tape. A conventional tracking device is comprised of guide flanges for guiding a running magnetic tape in a direction of the width of the magnetic tape. For example, a guide post having a pair of flanges for guiding the upper and lower edges of the magnetic tape may be provided in a tape travelling mechanism. In this device, however, the up-and-down shifting of the magnetic tape is prevented by causing the upper and lower edges of the magnetic tape to be contacted with the corresponding flanges. In this case, stresses are applied to the upper and lower edges of the magnetic tape, there being a risk that the upper and lower edges of the tape will be damaged.

SUMMARY OF THE INVENTION

It is accordingly the object of this invention to provide a tape tracking device, which can maintain a running magnetic tape at a reference position in a direction of the width of the magnetic tape without imparting damage to the tape.

In order to attain the object of this invention there is provided a tape tracking device, which comprises first and second reproducing heads disposed across the width of the tape such that they are in overlapped relation to those tape areas where signals are recorded and such that they suffer a different amount of overlap with respect to the tape areas when the tape is displaced in a direction of the width thereof, detection means for producing a signal corresponding to a difference between signals from the first and second reproducing heads and means for urging one of upper and lower edges of the tape in a direction of the width of the tape according to the output signal of the detection means.

DETAILED DESCRIPTION OF THE PREFERRED EMBODIMENT

Figure 1:
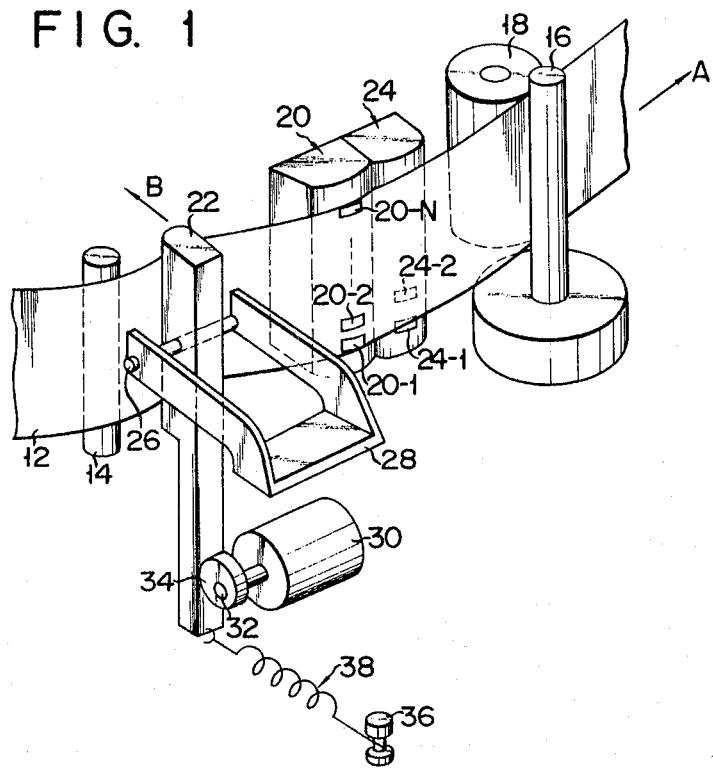
FIG. 1 is a perspective view showing a tape tracking device according to one embodiment of this invention.

FIG. 1 is a perspective view showing an arrangement of an embodiment of this invention as applied to a tape recorder. A magnetic tape 12, when set in a tape recorder, is contacted with a gude post 14 and capstan 16. The guide post 14 is fixed and serves to permit the magnetic tape 12 to be slidably moved along the surface thereof. The capstan 16 can be rotated by a drive motor not shown. The tape, when travelled, is passed through a nip between the capstan 16 and a rotatable pinch roller 18 in a manner to be supported therebetween and run in a direction indicated by an arrow A. In a reproduce mode the tape is placed in contact with a recording/reproducing head 20 and position correction post 22. The recording/reproducing head 20 is of a multi-head type and comprised of N number of magnetic heads 20-1, ..., 20-N. A position detection head 24 is comprised of reproduce only heads 24-1 and 24-2 and formed integrally with the adjacent recording/reproducing head. The position correction post 22 is supported by a pin 26 such that it can be rotated with respect to a support member 28. The pin 26 is located at a height level where the central portion of the width of the tape passes. The position correction post 22 is contacted with a tape face opposite to that tape face with which the guide post 14, recording/reproducing head 20 and position detection head 24 contact. The post 22 is disposed upright such that it provides a uniform pressure across the width of the tape, the pressure being imparted on the tape face opposite to that tape face with which the recording/reproducing head 20 is contacted. The post 22 is rotated with the pin 26 as a center to cause it to be tilted. When the post 22 is so tilted, it urges only the upper or the lower portion of the tape to permit the tape to be displaced in the downward or upward direction. The lower end of the post 22 is extended into contact with an eccentric cam 34 which is mounted on a shaft 32 of a DC reversible motor 30. The lower end portion of the extension of a position correction post 22 is biased by a tension spring 38 which is anchored to a fixed pin 36. As a result, the lower end portion of the post 22 is held in contact with the eccentric cam 34 to permit the post 22 to be maintained vertically upright.

Figure 2:
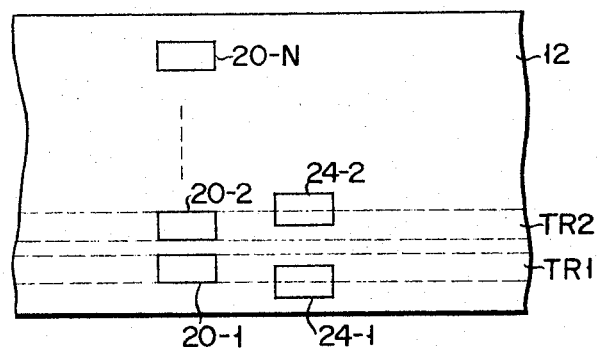
FIG. 2 is a view showing a positional relation of a recording/reproducing head to a position detection head of the device of FIG. 1.

FIG. 2 shows a positional relation of the recording/reproducing head 20 of N tracks to the position detection head 24 of 2 tracks.

The first position detection head 24-1 is located in a position lower than the first record/reproduce track TR1 for the first recording/reproducing head 20-1 by one half track width and the second position detection head 24-1 is located in a position higher than the second record/reproduce track TR2 for a second recording/reproducing head 24-2 by one half track width. As a result, the first and second position detection heads 24-1 and 24-2 reproduce signals on only one half portions of the first and second tracks.

Figure 3:
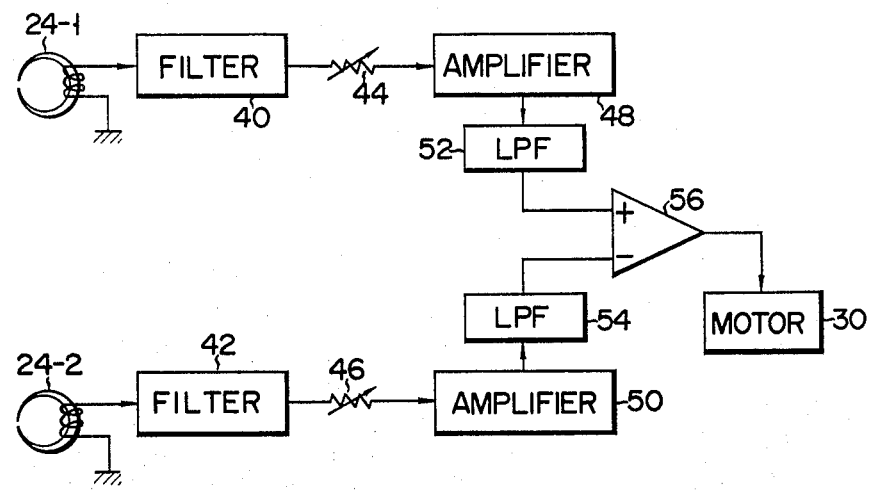
FIG. 3 is a block diagram showing an electrical circuit of the FIG. 1 embodiment.

FIG. 3 is a block diagram showing an electrical circuit arrangement of the embodiment of FIG. 3. The output signals of the first and second position detection heads 24-1 and 24-2 are supplied respectively through filters 40 and 42, variable resistors 44 and 46, amplifiers 48 and 50 and low-pass filters 52 and 54 to the noninverting and inverting terminals of an operational amplifier 56. The output signal of the operational amplifier 56 is supplied to the DC reversible motor 30 of FIG. 1.

The operation of the above-mentioned embodiment will be explained below.

Suppose that when an information signal such as sound is recorded through modulation onto the magnetic tape, a detection signal different in frequency from a carrier frequency is also recorded thereon and that the detection signal is recorded on the track on which the information signal is recorded. In this case, out of reproduced signals from the position detection heads 24-1 and 24-2, those information signals are removed by the filters 40 and 42 and only the desired detection signals are supplied to the amplifiers 48 and 50. When the magnetic tape is run in the reference position as shown in FIG. 2, the input signals to the operational amplifier 56 should be equal to each other, but might be somewhat displaced in actual practice. Such a deviation can be adjusted by varying the resistive values of the variable resistors 44 and 46. when the input signals to the operational amplifier 56 are equal to each other the output signal of the operational amplifier is at the 0 level. In consequence, the motor 30 is not driven and the position correction post 22 is maintained at the reference state and the magnetic tape 12 is uniformly urged by the position correction post 22 across the width thereof and maintained at the reference position.

Figure 4:
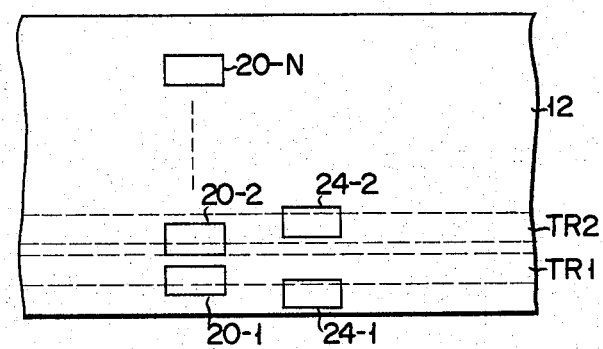
FIG. 4 is a view for explaining the operation of the embodiment of FIG. 1.
Figure 5:
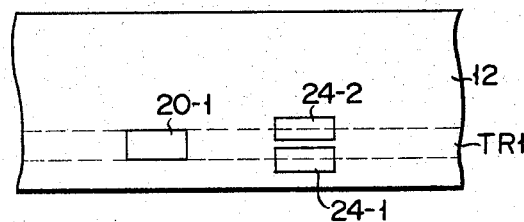
FIG. 5 is a view showing a positional relation of a recording/reproducing head to a position detection head of a tape tracking device according to another embodiment of this invention.

Explanation will now be given below to the case where the magnetic tape 12 is shifted up and down. Now suppose that the magnetic tape 12 is shifted upward as shown in FIG. 4. In the reference position, the half portions of the first and second position detection heads 24-1 and 24-2 are overlapping located at a position where a sound track of the magnetic tape is located. When, however, the magnetic tape is shifted upward, the first position detection head 24-1 has no substantial overlapping relation to the first track, whereas the second position detection head 24-2 has a substantial overlapping relation to the second track. For this reason, a reproduced signal from the first position detection head 24-1 becomes a smaller level and a reproduced signal from the second position detection head 24-2 becomes a greater level. A signal corresponding to a difference between both of the signals is supplied to the motor 30. The motor 30 is rotated by an amount corresponding to the magnitude of output signal in a direction corresponding to the polarity of the output signal of the operational amplifier. As a result, the eccentric cam 32 is rotated, causing the position correction post 22 to be tilted by the tension spring 38 and imparting an urging force which is different at the upper and lower end portions of the main section of the position correction post 22 to the tape. When the magnetic tape 12 is given such an urging force, it is shifted toward that end of the position correction post 22 where a smaller urging force is provided. Where a reproduced signal from the position detection head 24-1 is smaller, i.e. the magnetic tape is shifted upward, the DC reversible motor 30 is rotated such that it is tilted in a direction indicated by an arrow B. Where, on the other hand, the tape is shifted downward, the position correction post is rotated such that it is tilted in a direction opposite to the direction indicated by B.

When the magnetic tape is returned to the reference position as shown in FIG. 2 by the rotation of the DC reversible motor 30 the reproduced signals from the position detection heads 24-1 and 24-2 become equal to each other and the rotation of the motor is stopped.

According to this embodiment, when the magnetic tape is shifted up and down to cause "off-tracking", a deviation corresponding to the off-tracking is produced between the output signals of the reproducing heads for position detection. Since the position correction post imparts a nonuniform urging pressure to the upper and lower edges of the tape, the magnetic tape is automatically returned to the reference position. As a result, a signal on the track which was recorded during a record mode is all reproduced.

The position detection heads 24-1 and 24-2 are displaced from the corresponding tracks by one half track. This is because the reproduction output at the reference position can be made greatest. It will be sufficient if the same amount of displacement is theoretically involved between them. In this sense, the amount of displacement is not restricted to one half track width only. The position detection heads may be provided, for example, with respect to the first and N-th tracks, not with respect to the adjacent first and second tracks TR1 and TR2. Alternately, the position detection heads may be provided on one track, i.e. one on the upper side and one on the lower side of the first track TR1. In short, it is only necessary that when the magnetic tape is shifted up and down, the reproduction outputs of both the position detection heads suffer a level variation.

Although in the above-mentioned embodiment a detection signal is recorded on the track on which an information signal such as sound is recorded, if a detection signal only track is provided, the reproducing circuit can dispense with any filter, permitting a simpler arrangement. Where, for example, a sound signal is recorded through amplitude modulation, it can be used as a detection signal by taking out a variation of the amplitude of its carrier signal. Where a sound signal is recorded through frequency modulation, only a carrier signal can be taken out by properly selecting the modulation index and the characteristics of the filters 40, 42 in the reproducing circuit and by so doing the sound signal can be detected as a detection signal. This invention may be applied to not only a multi-track type recording-/reproducing device, but also a single-track type recording/reproducing device.

What is claimed is:

1. A device for tracking a tape during a reproduce mode of a tape recorder, comprising:
    first and second position detecting reproducing heads disposed across the width of a tape such that said position detecting heads are in an overlapped relation to that area of the tape where a signal is recorded and such that said position detecting heads suffer a different amount of shift with respect to said area of the tape when the tape is displaced in a direction of the width of the tape, said position detecting heads providing respective output signals which are a function of the amount of overlap of said heads with respect to said area of said tape;
    detection means coupled to said position detecting heads for producing an output signal corresponding to a difference in level between the output signals from said first and second position detecting heads; and correction means coupled to said detection means for applying corrective pressure to one edge portion of the tape across the width of the tape according to the output signal of said detection means.

2. A device according to claim 1, in which said first and second position detecting heads are in an equally overlapped relation to said area of said tape where a signal is recorded.

3. A device according to claim 1, in which said first and second position detecting heads are disposed such that they are in an overlapped relation to a tape area on which a detection signal different in frequency from a carrier signal which is modulated by an information signal is recorded.

4. A device according to claim 3, wherein:

said signal recorded on said tape area comprises a detection signal which is in an overlapped relation to an information signal on said tape; and said detection means includes a filter coupled to said first and second position detecting heads for separating said detection signal from said information signal and for passing only said detection signal.

5. A device according to any one of claims 1, 2, 3 or 4, wherein said correction means includes:

a direct-current reversible motor having an output shaft which is rotated according to the output signal of said detection means;

an eccentric cam mounted on said output shaft of said motor; and a rod member rotatably supported at a level corresponding to the center portion of the width of the tape and having one end portion placed in contact with the tape in a direction of the width of the tape and an opposite end portion in contact with said eccentric cam;

whereby rotation of said eccentric cam via said motor shaft causes said rod member to rotate about its upport to apply said corrective pressure to said tape.

6. A device according to any one of claims 1, 2, 3 or 4, wherein said first and second position detecting heads are disposed on opposite sides of said area of said tape where a signal is recorded.

7. A device according to any one of claims 1, 2, 3 or 4, wherein said area of said tape where a signal is recorded comprises at least two tracks of recorded information, one of said position detecting heads being overlapped on one of said at least two tracks, and the other of said position detecting heads being overlapped on the other of said at least two tracks.

8. A device according to any one of claims 1, 2, 3 or 4, wherein said first and second position detecting heads are overlapped in relation to said area of said tape by different amounts, and wherein said detection means comprises signal level adjusting means coupled to at least one of said position detecting heads to adjust the level of the output signal of said at least one position detecting head.

9. A device according to any one of claims 1, 2, 3 or 4, wherein said tape recorder comprises a recording/reproducing head of N tracks which is fixedly connected to said first and second position detecting heads so as to maintain a fixed positional relation between said recording/reproducing head and said position detecting heads.

* * * * *